(12) United States Patent
Geyer

(10) Patent No.: US 9,836,068 B2
(45) Date of Patent: Dec. 5, 2017

(54) METHODS AND APPARATUS FOR A CHEMICAL REGULATION SYSTEM

(71) Applicant: Michael J. Geyer, Tempe, AZ (US)

(72) Inventor: Michael J. Geyer, Tempe, AZ (US)

(*) Notice: Subject to any disclaimer, the term of this patent is extended or adjusted under 35 U.S.C. 154(b) by 103 days.

(21) Appl. No.: 14/864,623

(22) Filed: Sep. 24, 2015

(65) Prior Publication Data
US 2016/0085243 A1 Mar. 24, 2016

Related U.S. Application Data

(60) Provisional application No. 62/054,636, filed on Sep. 24, 2014.

(51) Int. Cl.
| | |
|---|---|
| *G05D 7/06* | (2006.01) |
| *G05D 11/13* | (2006.01) |
| *G05D 21/02* | (2006.01) |
| *C02F 1/68* | (2006.01) |
| *C02F 1/76* | (2006.01) |
| *C02F 103/42* | (2006.01) |

(52) U.S. Cl.
CPC ............. *G05D 21/02* (2013.01); *C02F 1/686* (2013.01); *C02F 1/76* (2013.01); *C02F 2103/42* (2013.01); *C02F 2209/006* (2013.01); *C02F 2209/40* (2013.01)

(58) Field of Classification Search
CPC ... G05D 21/02; C02F 1/686; Y10T 137/0335; Y10T 137/85954; E04H 4/1245
See application file for complete search history.

(56) References Cited

U.S. PATENT DOCUMENTS

| | | | | |
|---|---|---|---|---|
| 4,016,079 | A * | 4/1977 | Severin | B01F 1/0027 137/93 |
| 4,067,808 | A * | 1/1978 | Phillips | B01F 1/0016 137/205.5 |
| 4,115,270 | A * | 9/1978 | Phillips | B01F 1/0016 137/268 |
| 4,306,581 | A * | 12/1981 | Alandt | B01J 4/008 137/5 |
| 4,419,233 | A * | 12/1983 | Baker | B01F 1/0033 210/167.11 |
| 4,752,401 | A * | 6/1988 | Bodenstein | C02F 1/325 134/1 |
| 5,054,519 | A * | 10/1991 | Berman | B05C 3/02 118/429 |
| 5,422,014 | A * | 6/1995 | Allen | C02F 1/008 210/139 |

(Continued)

*Primary Examiner* — Craig Schneider
*Assistant Examiner* — Kevin Barss
(74) *Attorney, Agent, or Firm* — The Noblitt Group, PLLC

(57) ABSTRACT

A chemical regulation system according to various embodiments of the present technology is configured to regulate the flow rate of a liquid and monitors the chemical composition of the liquid. The chemical regulation system may comprise various valves, fittings, and couplings configured to regulate the flow of the liquid through a production tank and into a chemical hopper to product a highly concentrated liquid/chemical solution that is provided to the production tank. The chemical regulation system may comprise a controller to electrically control various valves. The chemical regulation system may comprise a device for facilitating the flow of a liquid out of a production tank.

20 Claims, 5 Drawing Sheets

(56) References Cited

U.S. PATENT DOCUMENTS

| | | | | |
|---|---|---|---|---|
| 5,928,608 A | * | 7/1999 | Levesque | B01F 1/0033 |
| | | | | 210/205 |
| 6,125,481 A | * | 10/2000 | Sicilano | C02F 1/008 |
| | | | | 210/143 |
| 6,497,822 B2 | * | 12/2002 | Blanchette | B01F 1/0022 |
| | | | | 210/167.11 |
| 6,657,546 B2 | * | 12/2003 | Navarro | C02F 1/008 |
| | | | | 210/149 |
| 6,715,515 B2 | * | 4/2004 | Klemme | A01M 7/0092 |
| | | | | 141/18 |
| 7,008,529 B2 | * | 3/2006 | Nakanishi | C02F 1/4674 |
| | | | | 204/278.5 |
| 7,632,402 B2 | * | 12/2009 | King | C02F 1/008 |
| | | | | 210/138 |
| 2003/0085239 A1 | * | 5/2003 | Crain | C02F 1/688 |
| | | | | 222/52 |

* cited by examiner

METHODS AND APPARATUS FOR A CHEMICAL REGULATION SYSTEM

CROSS-REFERENCE TO RELATED APPLICATION

This application claims priority to U.S. Provisional Patent Application Ser. No. 62/054,636, filed on Sep. 24, 2014 and incorporates the disclosure of the application in its entirety by reference. To the extent that the present disclosure conflicts with any referenced application, however, the present disclosure is to be given priority.

BACKGROUND OF THE INVENTION

Commercial and residential swimming pools, diving pools, hot tubs, and spas, and the like, require circulation systems and chemical treatment systems to sanitize the water, balance the pH, and remove impurities. These systems may incorporate automatic systems which feed chemicals, generally chlorine, into the water, and circulation systems to ensure the proper amount of water is being circulated in and out of the chemical treatment system. However mechanical issues may arise in these systems causing the chemicals to not feed properly or cause water to overflow in parts of the system. These mechanical issues may be caused by mineral deposits or other impurities in the water that prevent moving parts from functioning properly, thereby inhibiting operation of the chemical treatment system and circulation system. For instance, in conventional systems, mechanical elements, such as the shut-off valve, are always energized such that when a failure occurs in the shut-off valve, other mechanical elements of the system, such as a float valve, are not able to properly regulate the water intake, which may cause water to overflow in parts of the system. Additionally, conventional use of suction valves, which may become stuck in a closed position, may fail leading to insufficient chemical release. Improper or inconsistent treatment may cause bacterial build-up, the need for extra cleaning of the pool and pool systems, or complete replacement of elements within the systems.

SUMMARY OF THE TECHNOLOGY

A chemical regulation system according to various embodiments of the present technology is configured to regulate the flow rate of a liquid and monitors the chemical composition of the liquid. The chemical regulation system may comprise various valves, fittings, and couplings configured to regulate the flow of the liquid through a production tank and into a chemical hopper to product a highly concentrated liquid/chemical solution that is provided to the production tank. The chemical regulation system may comprise a controller to electrically control various valves. The chemical regulation system may comprise a device for facilitating the flow of a liquid out of a production tank.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of connectors, couplings, tubing, conduit, valves, regulators, pumps, nozzles, liquid and/or chemical tanks and/or hoppers, and the like, which may carry out a variety of functions. In addition, the present technology may be practiced in conjunction with any number of systems such as residential, commercial, and/or industrial chemical treatment systems and the system described is merely one exemplary application for the technology. Further, the present technology may employ any number of conventional techniques for distributing and/or mixing chemicals, measuring and/or sensing a liquid and/or chemical amount and/or concentration, controlling fluid flow, controlling valves, pumps, and the like, and coupling valves, conduit, nozzles, regulators, and the like.

Methods and apparatus for a chemical regulation system according to various aspects of the present technology may operate in conjunction with any suitable chemical treatment system and/or aquatic application. Various representative implementations of the present technology may be applied to any filtration and/or chlorination system for a pool.

Figure 1:
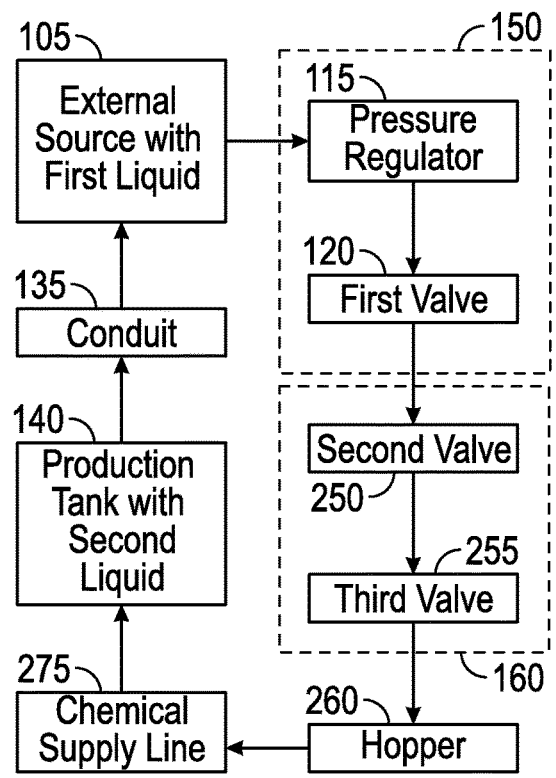
FIG. 1 representatively illustrates a block diagram of a chemical regulation system in accordance with a first exemplary embodiment of the present technology.
Figure 2:
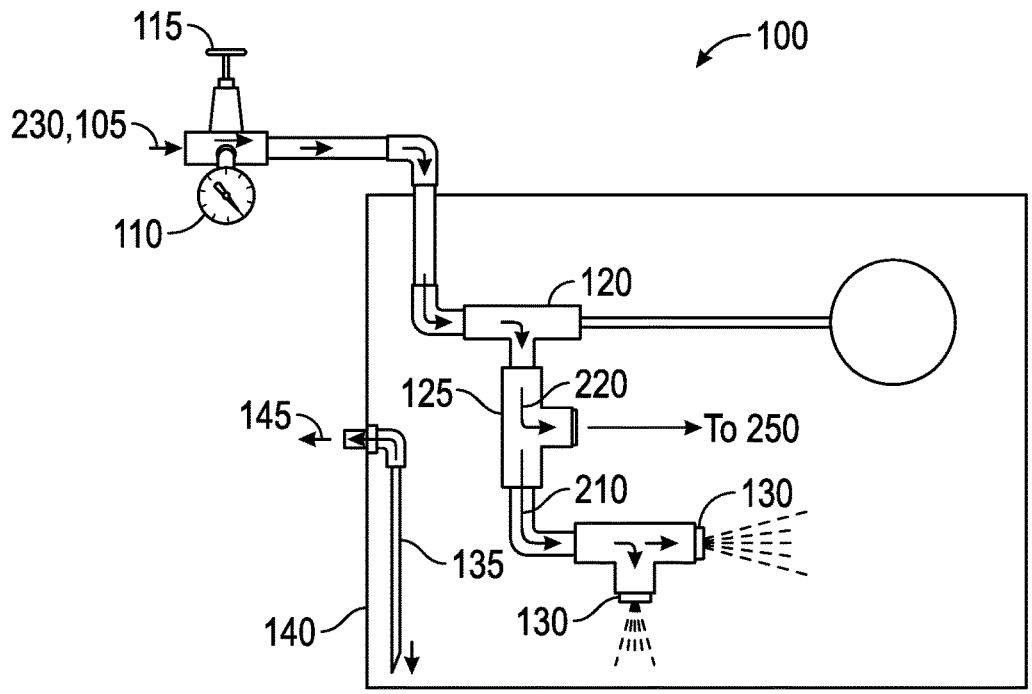
FIG. 2 representatively illustrates part of a chemical regulation system in accordance with the first exemplary embodiment of the present technology.
Figure 3:
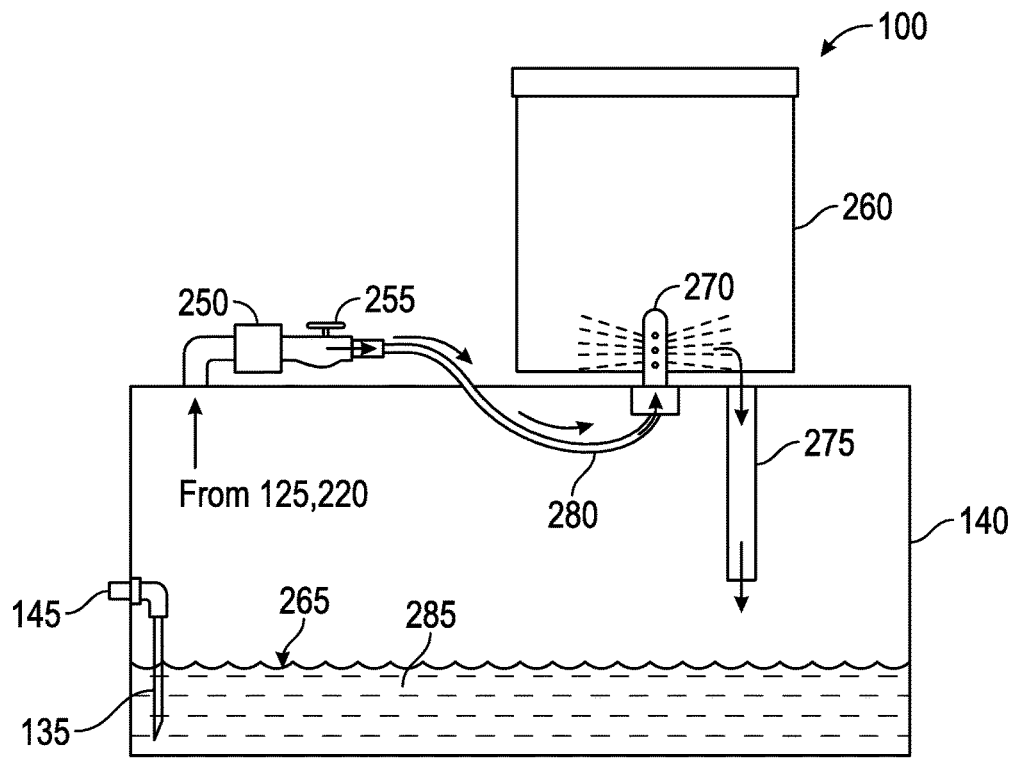
FIG. 3 representatively illustrates part of the chemical regulation system in accordance with the first exemplary embodiment of the present technology.
Figure 4:
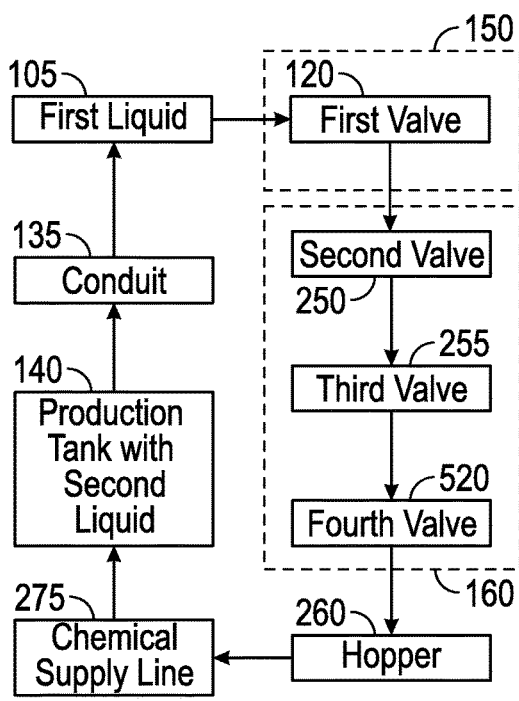
FIG. 4 representatively illustrates a block diagram of a chemical regulation system in accordance with a second exemplary embodiment of the present technology.
Figure 5:
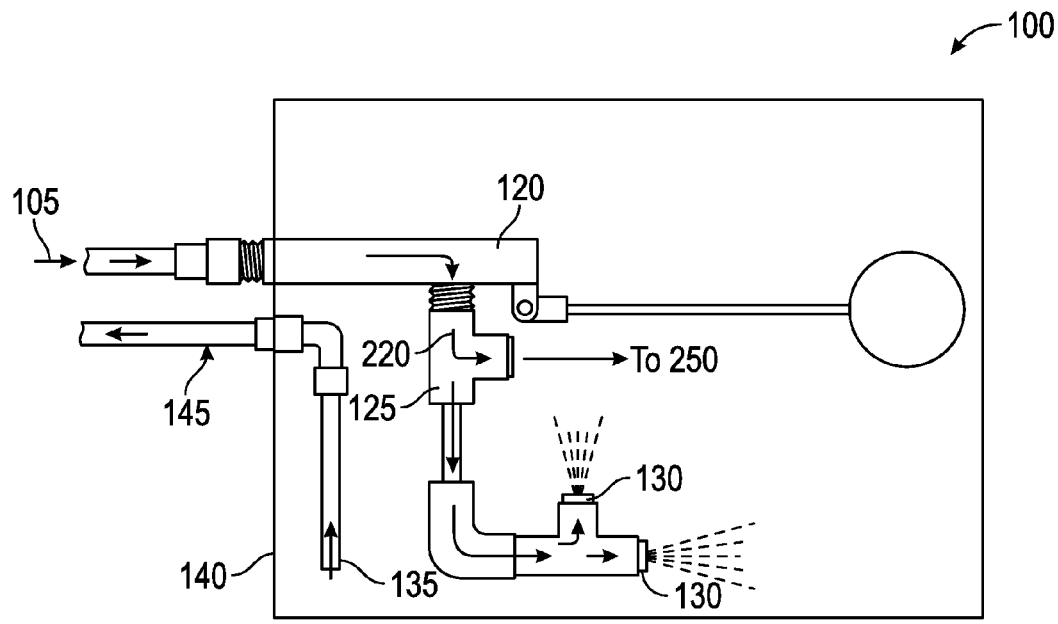
FIG. 5 representatively illustrates part of the chemical regulation system in accordance with the second exemplary embodiment of the present technology.
Figure 6:
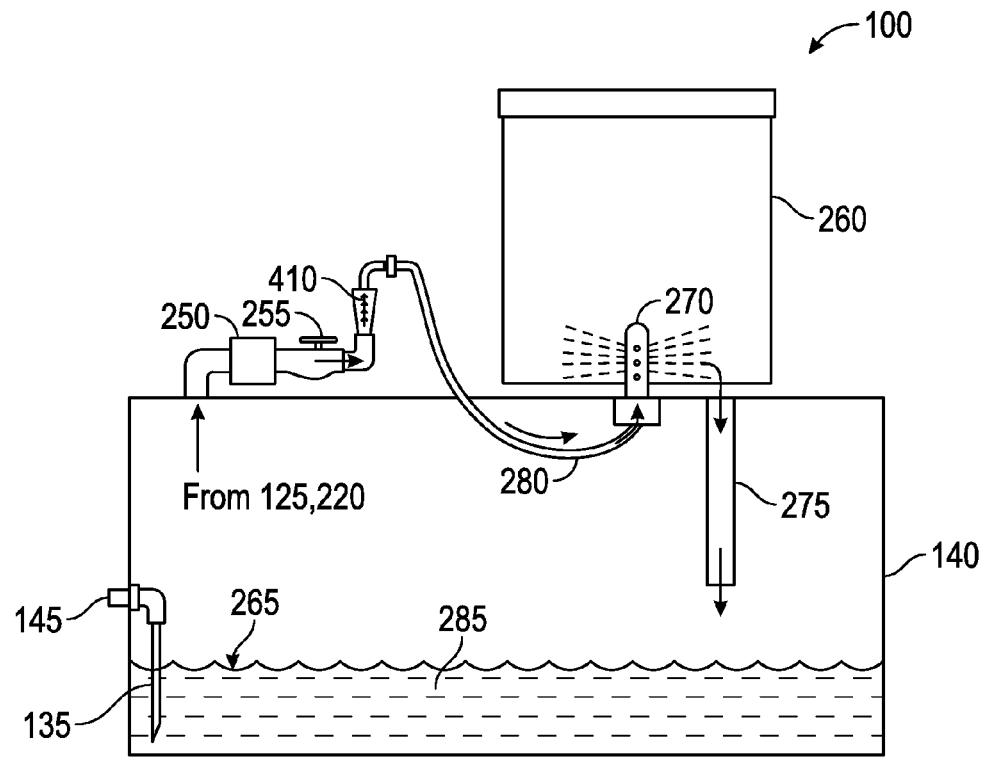
FIG. 6 representatively illustrates part of the chemical regulation system in accordance with the second exemplary embodiment of the present technology.
Figure 7:
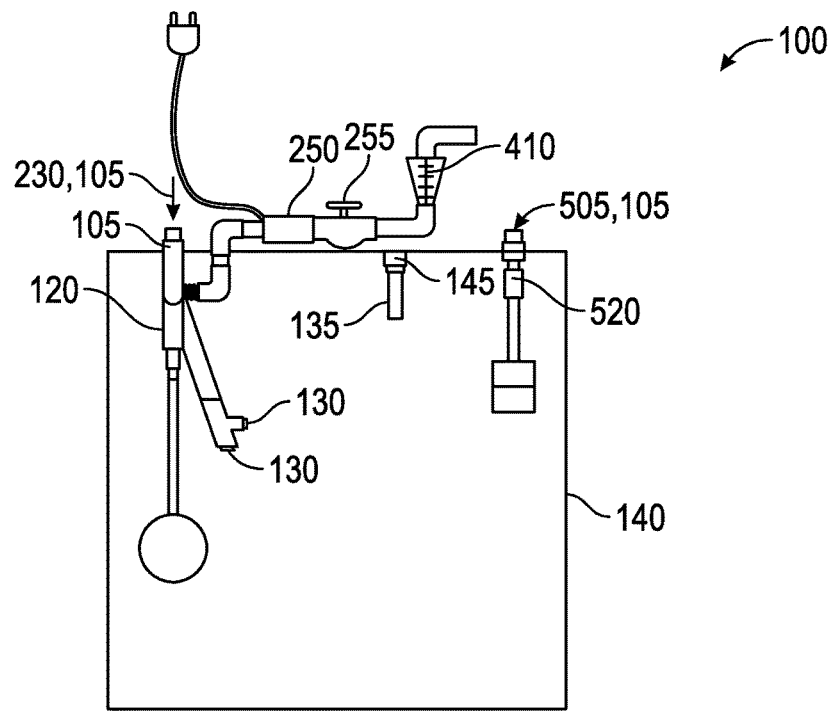
FIG. 7 representatively illustrates part of the chemical regulation system in accordance with the second exemplary embodiment of the present technology.

Referring now to FIGS. 1 through 3, in an exemplary embodiment of the present technology, a chemical regulation system 100 may comprise a production tank 140 (also referred to as a "feeder"), a chemical hopper 260, an inlet system 150 disposed at least partially within the production tank 140, and a feed system 160 positioned outside the production tank 140. The inlet system 150 and feed system 160 may comprise one or more components configured to facilitate the flow of a liquid into and out of the production tank 140, and the chemical hopper 260.

The inlet system 150 of the chemical regulation system 100 may comprise a pressure regulator 115 configured to couple to an external source of liquid, for example a swimming pool comprising a first liquid 105. In various embodiments, a booster pump (not shown) may be configured to pump a first incoming flow 230 of the first liquid 105 from the external source to the chemical regulation system 100. Various conduits and couplings may be used to couple to the external source and may be of any size and material suitable for the particular application of the chemical regulation system. For example, the pressure regulator 115 may be coupled to the external source of liquid by a length of conduit having a radius of about ⅝ inch. The pressure regulator 115 may control the output pressure of the first liquid 105 and may control a flow rate of the first liquid 105 to the remainder of the chemical regulation system 100 at all times, or substantially all of the time. The pressure regulator 115 may be adjustable or configured to provide a specific pressure flow.

The pressure regulator 115 may also be coupled to a pressure gauge 110, to facilitate the observation and/or setting of the output pressure of the pressure regulator 115. The pressure regulator 115 may be set to any suitable pressure based on any suitable criteria such as the size and type of components of the chemical regulation system 100, the pressure and/or flow requirements for the liquid flowing into and/or out of the chemical regulation system 100, or any other relevant factor. For example, when used in conjunction with a swimming pool, the pressure regulator 115 may be set between 10 pounds per square inch ("psi") and 150 psi. In one embodiment, the pressure regulator may be configured to operate at about 30 psi.

The pressure regulator 115 may be disposed upstream from and fluidly coupled to a first valve 120 located within the production tank 140. The first valve 120 may comprise any system or device configured to control or regulate the flow of the first liquid 105 into the production tank 140. The first valve 120 may be configured to selectively control the flow of the first liquid 105 based on a level 265 of a second liquid 285 contained in the production tank 140. For example, in an exemplary embodiment, the first valve 120 may comprise a ball float valve. The first valve 120 may comprise any suitable float valve configured to provide any suitable or desired flow rate, such as between about 0.5 gpm (gallons per minute) and about 100 gpm. The first valve 120 may be configured to provide varying flow rates according to a desired operational pressure. For example, the first valve 120 may be configured to provide approximately 8 gpm at 20 psi from the pressure regulator 115 or 15 gpm at 60 psi from the pressure regulator 115. For example, in one embodiment, the first valve 120 may comprise a ½ inch PVC float valve having a tank mounting, with a maximum operational rating of 100 psi.

The first valve 120 may be configured such that when the level 265 of the second liquid 285 has reached a maximum desired amount, the first valve 120 will shut off the flow of the first liquid 105 to all downstream components, and when the level 265 of the second liquid 285 is below a minimum desired amount, the first valve 120 will allow the flow of the first liquid 105 toward the downstream components. In one representative embodiment, the minimum desired amount and maximum desired amount comprise the same level, such that when the ball float is below this level, the ball float valve allows the flow of the first liquid 105, and when the ball float is above this level, the ball float valve prevents the flow of the first liquid 105. When configured in this way, the first valve 120 helps regulate the level 265 of the second liquid 285. Any suitable level 265 of the second liquid 285 may be used, for example to ensure enough of the second liquid 285 is present to be output from the production tank 140 and/or to meet demand requirements, while not overflowing the production tank 140.

The first valve 120 may be coupled to a splitter 125. The splitter 125 may comprise any suitable conduit for splitting an incoming liquid flow into multiple output liquid flows, for example a "T" or "Y" shaped connector, to produce a first flow 210 and a second flow 220. The splitter 125 may comprise or be coupled to one or more agitators 130. For example, the splitter 125 may be coupled to a pair of agitators 130 by a conduit or pipe suitably sized to accommodate the first flow 210. The one or more agitators 130 may comprise any suitable system or method for agitating and/or stirring the second liquid 285 in the production tank 140, for cleaning the production tank 140, or for otherwise substantially preventing the accumulation of sediment and/or other particulates in the production tank 140, and may be located in the production tank 140 accordingly. In an exemplary embodiment, each agitator 130 may comprise a spray nozzle, configured to provide a forceful flow of water to a portion of the production tank 140. For example, the one or more agitators 130 may be located near the bottom of the production tank 140 to keep the bottom of the production tank 140 clean or otherwise help prevent the accumulation of sediment along the bottom of the production tank 140.

The splitter 125 may also be coupled to a second valve 250. The second valve 250 may comprise any suitable system or device for selectively controlling a supply of liquid to downstream components, for example a control valve. The second valve 250 may be electrically coupled to a chemical monitoring system (not shown), which may determine when additional chemical is required by the system that the chemical regulation system 100 is used in conjunction with. The chemical monitoring system may comprise a controller (not shown) electrically connected to the second valve and may operate the second valve 250 for any suitable purpose, such as to cause or cease the addition of chemical, to stop the flow of liquid if an emergency condition is detected, and the like. The controller may operate the second valve 250 in any suitable manner, for example by providing electrical power or not, by providing an appropriate control signal, and the like. In an exemplary embodiment, the second valve 250 may comprise a solenoid valve, such as a ½ inch brass or NSF-listed composite solenoid valve.

In an alternative embodiment, the first valve 120 may be coupled to the second valve 250 without the use of the splitter 125. This may be done, for example, if no agitators 130 are required because the stirring, cleaning, and/or accumulation prevention is provided by a separate system and/or method, if stirring, cleaning, and/or accumulation prevention is not necessary for a particular application of the chemical regulation system 100, or for any other suitable reason.

The second valve 250 may be coupled to a third valve 255, which may comprise any suitable valve for controlling the amount of liquid flowing through the third valve 255, for example a capacity valve. The third valve 255 may be adjustable or suitably configured to provide a specific flow rate. The third valve 255 may be adjusted to any suitable flow amount, for example based on the size of a swimming pool the chemical regulation system 100 is used in conjunction with, a rate at which the first liquid 105 should be supplied to the chemical hopper 260, or based on any other relevant requirements. In an exemplary embodiment, the third valve 255 may comprise a ball valve, such as a ½ inch ball valve. In other embodiments, the third valve 255 may comprise a needle valve, such as a ½ inch needle valve. In some embodiments, the second valve 250 and the third valve 255 may be integrated as a single valve system.

The third valve 255 may be coupled to the chemical hopper 260 via a fluid line 280. The fluid line 280 may supply the chemical hopper 260 with the first liquid 105, and may be of any size and material suitable for the particular application of the chemical regulation system 100. The chemical hopper 260 may comprise any suitable container allowing for the storage of one or more chemicals and/or chemical compounds, such as chlorine or salt. The chemical hopper 260 may comprise an inlet 270 configured to couple to the fluid line 280. The inlet 270 may comprise any suitable system or method for passing a liquid, for example a nozzle, sprayer, dripper, faucet, and the like. In an exemplary embodiment, the first liquid 105 may flow through the fluid line 280 into the chemical hopper 260 to mix with one or more chemicals and/or chemical compounds contained within the chemical hopper 260. The one or more chemicals and/or chemical compounds may be at least partially dissolved in the first liquid 105, forming a concentrated liquid/chemical solution. For example, the first liquid 105 may comprise water or a mixture of water and one or more chemicals that is flowed through the fluid line 280 to the chemical hopper 260 containing chlorine. The first liquid 105 may mix with the chlorine forming a concentrated chlorine solution greater than that which may have been present in the first liquid 105 upon entering the chemical hopper 260. In an exemplary embodiment, the flow of the first liquid 105 to the second valve 250 may be constantly pressurized in order to control the flow of the first liquid 105 into the chemical hopper 260. For example, so long as the first valve 120 is in the open position, such that when the controller determines that more chemical is needed, it may cause the second valve 250 to open, allowing the first liquid 105 to mix with the chemical.

The chemical hopper 260 may be coupled to the production tank 140 via a conduit to allow flow of the concentrated liquid/chemical solution from the chemical hopper 260 into the production tank 140. The concentrated liquid/chemical solution may be diluted once it is added to the second liquid 285 contained in the production tank 140. The production tank 140 may comprise any suitable container allowing for storage of a liquid, such as water, and may be constructed of plastic, non-corrosive metal, or any other material suitable for storing a liquid.

In an exemplary embodiment, the chemical hopper 260 may be located at an elevated position compared to the production tank 140 and may be coupled with the production tank via a chemical supply line 275, for example a drain, such that gravity may cause the flow of the liquid/chemical solution to the production tank 140. In another embodiment, a suitable pump may be used to facilitate the flow of the liquid/chemical solution to the production tank 140. When the liquid/chemical solution enters the production tank 140, it may mix with any of the second liquid 285 contained within the production tank 140.

The production tank 140 may comprise an outlet 145 configured to allow the second liquid 285 to flow from inside to outside of the production tank 140 where the second liquid 285 may be flowed to a body of water such as the swimming pool. The outlet 145 may comprise any suitable system or device, such as a ½ inch or ⅝ inch tube, and may be configured to connect other components or systems. A conduit 135, for example a suction tube, may be coupled to the outlet 145, and may comprise any suitable system or method for facilitating the flow of the second liquid 285 from inside of the production tank 140 to the outlet 145. The conduit 135 may also facilitate drawing the second liquid 285 from a specific portion of the production tank 140, for example near the bottom of the production tank 140. In an embodiment, the conduit 135 may comprise a ½ inch or ⅜ inch tube that is configured to draw the second liquid 285 from the production tank 140. The outlet 145 may be configured to couple to any suitable system for receiving the second liquid 285, for example a swimming pool and/or part of a water treatment system. In one embodiment, the outlet 145 may be coupled to a venturi-type ozone injection system to inject ozone into the second liquid 285, which may then be fed (directly or indirectly) to the external source containing the first liquid 105, for example, the swimming pool. The second liquid 285 may have a different chemical composition than the first liquid 105 and may be further diluted once the second liquid 285 is added to the body of water.

Referring now to FIGS. 4 through 7, in another exemplary embodiment, a chemical regulation system 100 may comprise the production tank 140, the chemical hopper 260, and one or more components configured to facilitate the flow of a liquid into and out of the production tank 140 and chemical hopper 260.

In this exemplary embodiment of the chemical regulation system 100, the first valve 120 may be coupled to the external source of liquid comprising the first incoming flow 230 of the first liquid 105 without the use of a pressure regulator 115, as the first valve 120 (and the other components of the chemical regulation system 100) may be selected to withstand any pressure expected to be received from the external source of liquid or operate independently of the supply pressure of the first liquid 105. The first valve 120 may be coupled to the splitter 125, and the splitter may be coupled to the one or more agitators 130 and the second valve 250. In another embodiment, if the function of the agitators 130 is performed by a separate system and/or not required, the first valve 120 may be coupled to the second valve 250 without the use of the splitter 125, as described above.

The second valve 250 may be coupled to the third valve 255, which may in turn be connected to a flow rate measuring device 410. The flow rate measuring device 410 may comprise any suitable system or method for measuring and/or controlling the flow rate and/or pressure of the first liquid 105, such as a flow meter, or a regulator similar to the pressure regulator 115 previously described. In some embodiments, the second valve 250, the third valve 255, and/or the flow rate measuring device 410 may be embodied as a single valve system.

The flow rate measuring device 410 may be positioned upstream of and coupled to a first end of the fluid line 280. A second end of the fluid line 280 may be coupled to the inlet 270 of the chemical hopper 260. The chemical hopper 260 may be coupled to the production tank 140 as previously described, for example via the chemical supply line 275. The production tank 140 may comprise the outlet 145, and may comprise the conduit 135 coupled to the outlet 145, as previously described.

The chemical regulation system 100 may further comprise a fourth valve 520, for example a secondary float valve, located in the production tank 140. The fourth valve 520 may also be coupled to the external source comprising the first liquid 105 through a second incoming flow 505. In various embodiments, a booster pump (not shown) may be configured to pump the first liquid 105 from the second incoming flow 505 to the chemical regulation system 100. Various conduits and couplings may be used to couple to the external source and may be of any size and material suitable for the particular application of the chemical regulation system. For example, the fourth valve 520 may be coupled to the external source of liquid by a length of conduit having a radius of about 3/8 inch. The fourth valve 520 may be configured and located to prevent the level 265 of the second liquid 285 from dropping below the opening of the conduit 135 so that the conduit 135 does not intake air. The fourth valve 520 may comprise any suitable float valve having any suitable flow rate, such as between about 0.5 gpm and about 100 gpm, for example approximately 4.4 gpm at 20 psi or 7.2 gpm at 60 psi. In an embodiment, the forth valve 520 may comprise a 3/8 inch PVC float valve having a tank mounting.

Figure 8:
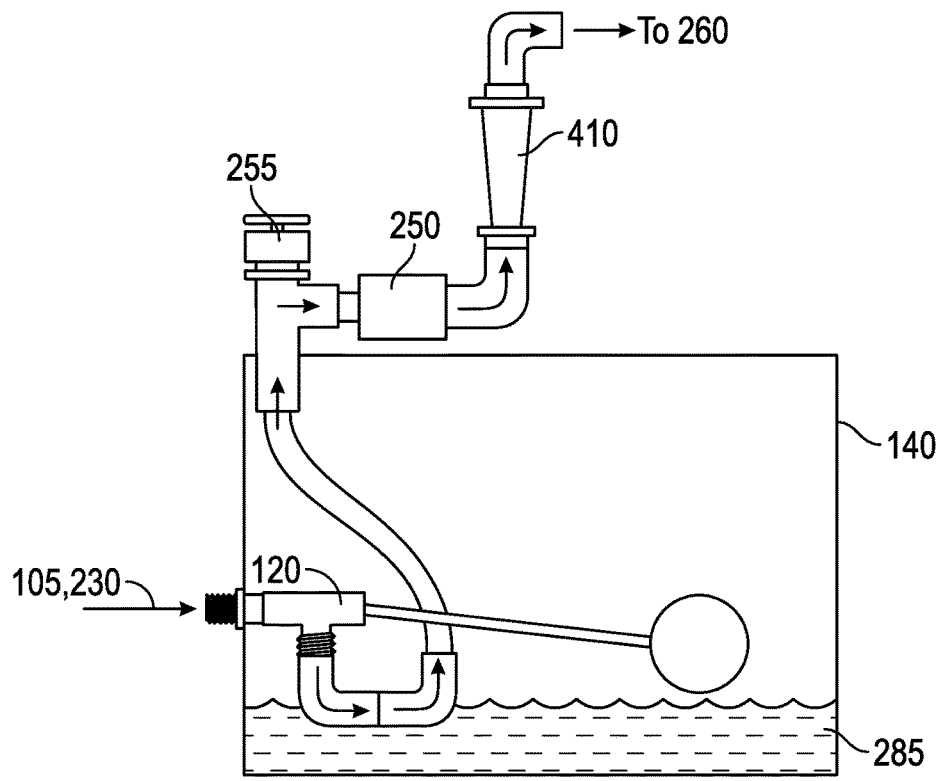
FIG. 8 representatively illustrates part of the chemical regulation system in accordance with another exemplary embodiment of the present technology.
Figure 9:
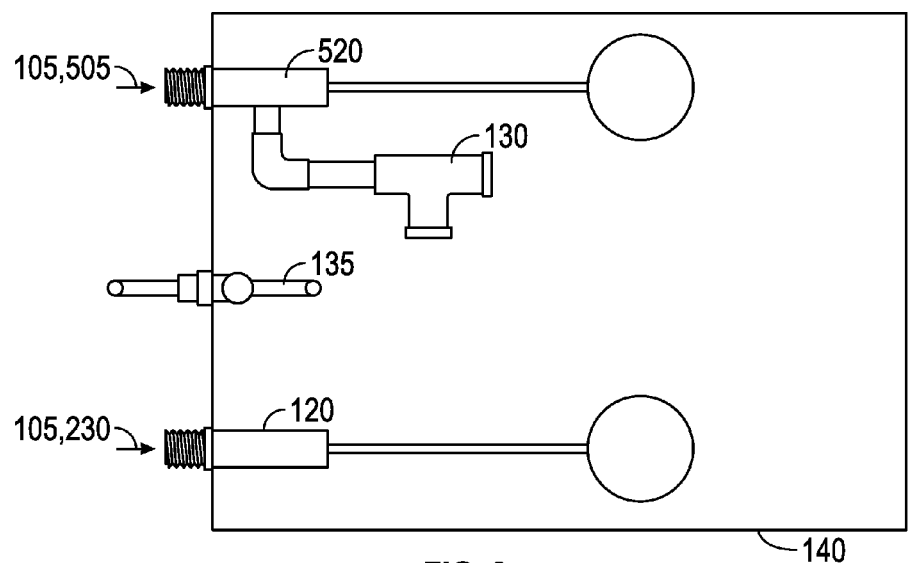
FIG. 9 representatively illustrates part of the chemical regulation system in accordance with another exemplary embodiment of the present technology.
Figure 10:
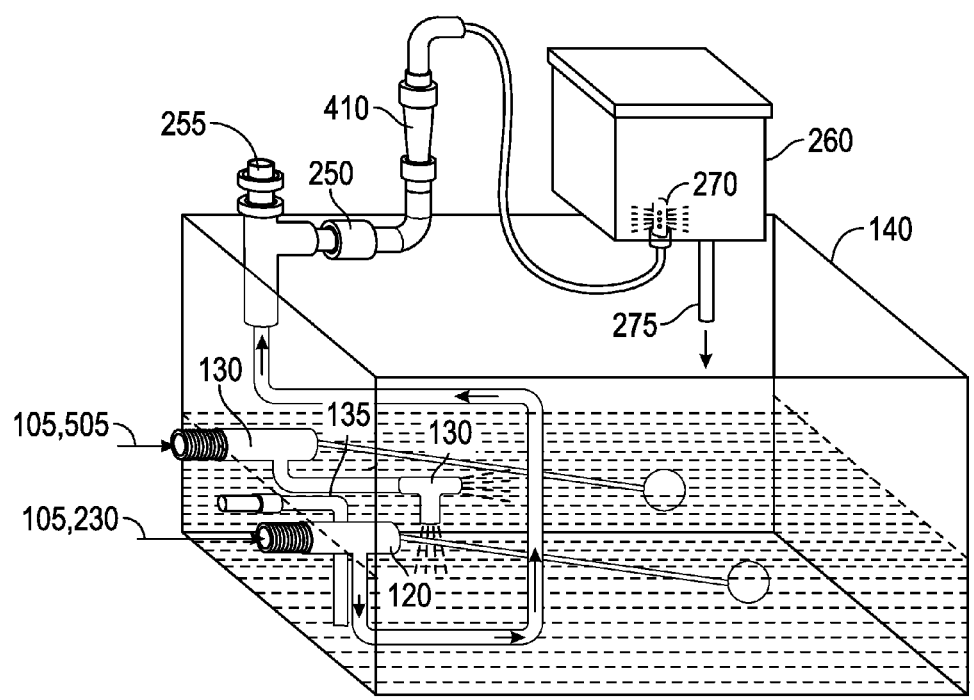
FIG. 10 representatively illustrates the chemical regulation system in accordance with one embodiment of the present technology.

Referring now to FIGS. 8 through 10, in another exemplary embodiment, the chemical regulation system 100 may comprise the production tank 140, the chemical hopper 260, and one or more components configured to facilitate the flow of a liquid into and out of the production tank 140 and chemical hopper 260.

In this exemplary embodiment of the chemical regulation system 100, the first valve 120 may be coupled to the external source of liquid comprising the first incoming flow 230 of the first liquid 105 with or without the use of a pressure regulator 115, as the first valve 120 (and the other components of the chemical regulation system 100) may be selected to withstand any pressure expected to be received from the external source of liquid. The first valve 120 may be coupled directly to the feed system 160 without the use of the splitter 125. In an exemplary embodiment, the feed system 160 comprises the second and third valves 250, 255. In various embodiments, the position of the second valve 250 and the third valve 255 relative to one another and the order through which the first liquid 105 flows may be determined based on the physical orientation of the fittings. For example, the third valve 255 may be positioned downstream of the second valve 250, or the second valve 250 may be positioned downstream of the third valve 255, as illustrated.

In this embodiment, the agitators 130 may be incorporated into a separate system. For example, the fourth valve may be configured to receive the second incoming flow 505 of the first liquid 105. The agitators 130 may be coupled to the fourth valve and configured to receive the second incoming flow 505 of liquid and accelerate the second incoming flow 505 towards the bottom of the production tank 140. In this embodiment, when a predetermined level of the second liquid 285 is reached or exceeded, the second incoming flow 505 of the first liquid 105 may be blocked.

In the exemplary embodiments shown in FIGS. 1 through 10, the first valve 120 may be configured to act as an emergency shut off valve in the event the conduit 135, outlet 145, or any other downstream component gets clogged, plugged, turned off, or the like, causing the level 265 of the second liquid 285 in the production tank 140 to rise higher than desired.

As will be understood by one of ordinary skill in the art, the various components of the chemical regulation system 100, such as the various valves, nozzles, regulator, and the like, may be coupled together directly or indirectly. Any suitable conduit may be used to indirectly couple the various components. As will also be understood by one of ordinary skill in the art, the various components, while discussed separately, may be embodied as single systems performing the functions of one or more of the described components. For example, the splitter 125 may comprise a system that performs the functions of splitting the flow of liquid as well as the function of the second valve 250.

As will also be understood by one of ordinary skill in the art, the various components, including any conduit, of the chemical regulation system 100 may be sized based on any number of factors, including flow rate and/or pressure requirements of a system the chemical regulation system 100 is configured to couple to, the volume of liquid required to be output from the chemical regulation system 100, mechanical tolerances and limits of the various components themselves, the liquids and/or chemicals used in the chemical regulation system 100 and the like. Similarly, one of ordinary skill in the art will understand that the various components of the chemical regulation system 100 may be made from any suitable material, for example copper, PVC, brass, and the like, and the choice of material may depend on the particular application of the chemical regulation system 100. Relevant regulations and standards, such as those promulgated by NSF International, may also affect the choice of size, material, and the like, for the various components of the chemical regulation system 100.

The foregoing disclosure is merely illustrative of the present technology and is not intended to be construed as limiting the invention. Although one or more embodiments of the present technology have been described, persons skilled in the art will readily appreciate that numerous modifications could be made without departing from the spirit and scope of the present technology. As such, it should be understood that all such modifications are intended to be included within the scope of the present technology.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A chemical regulation system for a body of water fluidly coupled to a production tank and a chemical hopper, comprising:
an inlet system disposed within the production tank comprising:
a fluid conduit configured to provide a first incoming flow of a first liquid;
a first valve coupled to the fluid conduit and configured to regulate the first incoming flow of the first liquid into the production tank based on a level of a second liquid contained within the production tank;
a feed system coupled downstream of the first valve and positioned outside of the production tank, wherein the feed system is configured to receive the first liquid and comprises:
a chemical monitoring system configured to determine when additional chemical is required to be supplied to the body of water;
a second valve responsive to the chemical monitoring system and configured to control a second flow; and
a fluid line coupling the second valve to the chemical hopper, wherein the fluid line is configured to provide the second flow to the chemical hopper;
a chemical supply line configured to flow a liquid/chemical solution from the chemical hopper into the second liquid within the production tank; and
a conduit configured to direct the second liquid away from the production tank.

2. The chemical regulation system of claim 1, further comprising a pressure regulator positioned upstream of the first valve, wherein the pressure regulator is configured to regulate a pressure of the first incoming flow of the first liquid to the first valve.

3. The chemical regulation system of claim 1, further comprising:
a third valve coupled to the second valve and configured to provide flow of the first liquid based on a volume of the first liquid; and
a flow rate measuring device positioned downstream of the second and third valves, wherein the flow rate measuring device is configured to measure a flow of the first liquid.

4. The chemical regulation system of claim 3 wherein the flow rate measuring device comprises a flow meter.

5. The chemical regulation system of claim 3, wherein:
the first valve comprises a float valve;
the second valve comprises a solenoid valve; and
the third valve comprises a needle valve.

6. The chemical regulation system of claim 1, wherein the conduit comprises a suction tube.

7. The chemical regulation system of claim 1, wherein the chemical monitoring system comprises a controller electrically connected to the second valve and configured to transmit a signal to open or close the second valve.

8. The chemical regulation system of claim 1, further comprising a fourth valve disposed within the production tank and configured to receive a second incoming flow of the first liquid.

9. The chemical regulation system of claim 8, further comprising an agitator coupled to the fourth valve and configured to:
receive the second incoming flow of liquid; and
accelerate the second incoming flow towards the bottom of the production tank.

10. A system for regulating the flow of liquid within a production tank comprising:
a first valve configured to regulate a first incoming flow of a first liquid based on a level of a second liquid contained within the production tank, wherein the second liquid comprises a different chemical composition than the first liquid;
a feed system coupled downstream of the first valve and positioned outside of the production tank, wherein the feed system is configured to receive the first liquid and comprises:
a second valve configured to receive a second flow of the first liquid, and control the flow of the first liquid, wherein the second valve is responsive to an electrical signal;
a third valve coupled to the second valve, wherein the third valve is configured to provide flow of the first liquid based on a volume of the first liquid; and
a conduit positioned below a predetermined level of the second liquid and configured to facilitate flow of the second liquid out of the production tank.

11. The system for regulating the flow of liquid of claim 10 further comprising a pressure regulator positioned upstream of the first valve, wherein the pressure regulator is configured to regulate pressure of the first liquid.

12. The system for regulating the flow of liquid of claim 10 further comprising a flow rate measuring device positioned downstream of the first valve, wherein the flow rate measuring device is configured to measure a flow of the first liquid.

13. The system for regulating the flow of liquid of claim 12 wherein the flow rate measuring device is a flow meter.

14. The system for regulating the flow of liquid of claim 10 wherein:
the first valve comprises a float valve;
the second valve comprises a solenoid valve; and
the third valve comprises a needle valve.

15. The system for regulating the flow of liquid of claim 10 wherein the conduit comprises a suction tube.

16. The system for regulating the flow of liquid of claim 10 further comprising a controller electrically connected to the second valve and configured to transmit a signal to open or close the second valve.

17. The system for regulating the flow of liquid of claim 10 further comprising a hopper configured to:
accept the first liquid;
hold one or more chemicals;
mix the first liquid with the one or more chemicals to produce a solution; and
discharge the solution into the second liquid.

18. The system for regulating the flow of liquid of claim 10 further comprising a fourth valve disposed within the production tank, configured to receive a second incoming flow of the first liquid.

19. The system for regulating the flow of liquid of claim 18 further comprising an agitator coupled to the fourth valve and configured to:
receive the second incoming flow of liquid; and
accelerate the second incoming flow towards the bottom of the production tank.

20. A method for regulating the chemical composition of a body of water fluidly coupled to a production tank and a chemical hopper comprising:
receiving a first liquid from the body of water;
regulating, with a first valve coupled to and positioned downstream of the pressure regulator, the flow of the first liquid based on a level of a second liquid contained within the production tank;
controlling the flow of the first liquid using a second valve coupled to and positioned downstream of the first valve, wherein the second valve is responsive to an electrical signal;
detecting the chemical composition of the first liquid;
activating a controller electrically connected to the second valve, wherein the controller is:
responsive to the detected chemical composition; and
configured to transmit a signal to open or close the second valve when the chemical composition reaches a predetermined level;
regulating a second flow of the first liquid based on a volume of the first liquid using a third valve coupled to the second valve;
directing the flow to the hopper, wherein the chemical hopper is configured to:
hold one or more chemicals;
accept the first liquid at an inlet coupled to the third valve;
mix the first liquid with the one or more chemicals to produce a solution;
discharge the solution from the hopper through an outlet into the second liquid; and
facilitating flow of the second liquid out of the production tank by positioning a conduit below a predetermined level of the second liquid.

* * * * *